(12) United States Patent
Brunet et al.

(10) Patent No.: US 6,906,505 B2
(45) Date of Patent: Jun. 14, 2005

(54) DEVICE FOR VISUAL IDENTIFICATION OF CABLES OR CONDUITS

(76) Inventors: Patrice Brunet, 37 rue Gambetta, 69270 Fontaines sur Saone (FR); Eric Tande, 2 rue des Castors, 69660 Collonges au Mont d'Or (FR)

( * ) Notice: Subject to any disclaimer, the term of this patent is extended or adjusted under 35 U.S.C. 154(b) by 0 days.

(21) Appl. No.: 10/220,933

(22) PCT Filed: Jan. 17, 2001

(86) PCT No.: PCT/FR01/00144
§ 371 (c)(1),
(2), (4) Date: Nov. 27, 2002

(87) PCT Pub. No.: WO01/67150
PCT Pub. Date: Sep. 13, 2001

(65) Prior Publication Data
US 2003/0152344 A1 Aug. 14, 2003

(30) Foreign Application Priority Data
Mar. 6, 2000 (FR) .................................... 00 02865

(51) Int. Cl.[7] ............................. G01R 19/00; H04B 3/46
(52) U.S. Cl. ......................................... 324/66; 324/542
(58) Field of Search ..................... 324/66, 542, 537, 324/543; 385/101; 340/815.4, 815.42, 815.45

(56) References Cited

U.S. PATENT DOCUMENTS

| | | | | |
|---|---|---|---|---|
| 3,706,134 A | * | 12/1972 | Sweeney et al. ............... 29/833 |
| 4,074,187 A | | 2/1978 | Miller et al. ................. 324/542 |
| 4,690,498 A | * | 9/1987 | Priaroggia ................... 385/113 |
| 4,695,127 A | * | 9/1987 | Ohlhaber et al. ............ 385/101 |
| 5,305,405 A | * | 4/1994 | Emmons et al. ............... 385/73 |
| 5,353,367 A | * | 10/1994 | Czosnowski et al. ........ 385/135 |
| 5,625,735 A | | 4/1997 | Di Maggio et al. ........... 385/91 |
| 5,666,453 A | | 9/1997 | Dannenmann ............... 385/101 |
| 5,764,043 A | * | 6/1998 | Czosnowski et al. ......... 324/66 |
| 6,208,796 B1 | * | 3/2001 | Williams Vigliaturo ..... 385/135 |

FOREIGN PATENT DOCUMENTS

| CN | 1034813 | 8/1989 |
|---|---|---|
| CN | 1095484 | 11/1994 |
| DE | 40 42 317 | 12/1990 |
| FR | 2725796 | 4/1996 |
| GB | 2215483 | 8/1989 |
| WO | WO 94/19702 | 1/1994 |
| WO | WO 00/05611 | 2/2000 |

* cited by examiner

Primary Examiner—Anjan K. Deb
(74) Attorney, Agent, or Firm—Cantor Colburn LLP

(57) ABSTRACT

The invention provides a device for accurately locating ends of cords, wires cables or conduits, in particular in the fields of electricity, electronics, telephone and computer. The device includes an optical fiber disposed on a cord and extending from a first end to a second end of the cord. The optical fiber includes a first fiber end disposed at the first end of the cord and a second fiber end disposed at the second end of the cord. The device further includes a means for injecting light disposed proximate the first fiber end, the first fiber end being accessible so as to be illuminated by the means for injecting light and the second fiber end being accessible so as to recover the light injected at the first fiber end. Said device is useful for locating computer switching cords.

12 Claims, 2 Drawing Sheets

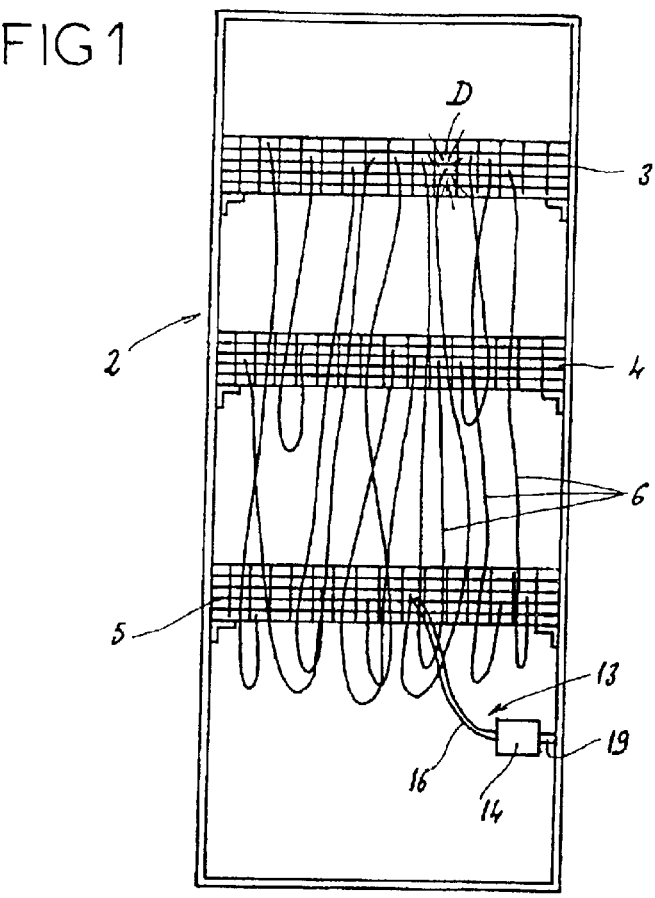
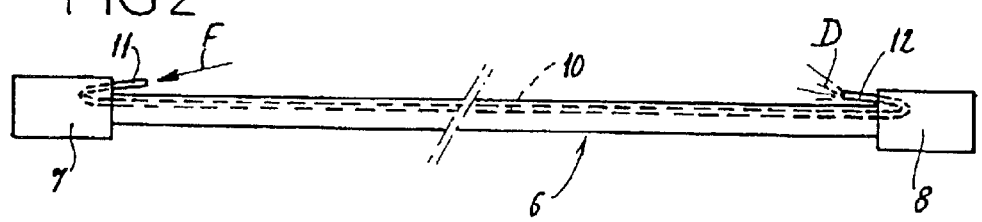

DEVICE FOR VISUAL IDENTIFICATION OF CABLES OR CONDUITS

FIELD OF INVENTION

The present invention relates to a device for visual identification of cable assemblies or conduits, more particularly, a device which makes it easier to locate the ends of leads, wires or cables used in the following fields: electrical, electronic, telephone, computing, automatic control etc., or else to locate the ends of rigid or flexible conduits through which fluids flow and which belong to hydraulic or pneumatic or other installations.

BACKGROUND OF INVENTION

In various technical fields using networks of relatively numerous wires, cables or conduits, the practical problem arises of being able, by knowing the position of one end of a wire, cable or conduit, to identify the position of the other end of the same wire, cable or conduit in a precise and certain manner. Such is the case, in particular, with leads called computer "jumper" leads, housed in a cabinet or a case, telephone "patching" systems, or wires and cables of electrical cable assemblies, whether these be wires conveying data signals, or power cables, etc.

More particularly in the case of cabinets referred to as "jumper" cabinets for computer links, many "jumper" leads are passed between the active computer hardware and the jumper panels, and it is very difficult to follow a lead over its entire length, from one of its ends, in order to be able to find its other end and thus make the link between a connector of given number of the distribution cable assembly and a port number of an active hardware item.

The current possible ways of locating the inputs and outputs of a cable or of a lead are the following:

- the simplest and most direct method is "physical" tracking, by sight or touch. However, this first method is not very practical, and a source of errors, in the case of many entangled leads;
- another method consists in marking the cables or leads at both their ends, by labeling them. Each cable or lead end is thus identified in theory, but there is an obvious difficulty in rapidly locating an end of a lead already in place (from a multiplicity of leads);
- it is also possible to distinguish the cables or leads by different external colors, but this method does not offer sufficient options, the maximum number of colors available being of the order of ten;
- another method may consist in disconnecting the cables or leads, in order to identify them according to the consequence of their disconnection, but this means a temporary stoppage of the operation of the system connected to the cable or lead that has been disconnected, which stoppage is in many cases unacceptable;
- one technical solution available consists of specific software and a specific database. However, this solution is complex to manage, a source of errors during updating, and very expensive;
- it is also possible to use an automatic acquisition system, but the latter solution, involving the addition of an electrical conductor in each cable or lead, is a source of electromagnetic interference when injecting an electrical signal into the additional conductor.

One exemple disclosed in U.S. Pat. No. 5,666,453 A describes fiber-optic cables or leads provided with a system for locating the ends by means of light-emitting diodes supplied via electrical conductors incorporated into the leads or cables. This solution therefore requires the incorporation of electrical circuits and of specific components, such as light-emitting diodes, on all the leads and cables to be located. Thus, such a solution is particularly expensive, given the large number of cables or leads that have to be equipped therewith. In addition, the electrical conductors of this system may create electromagnetic interference.

Another exemple disclosd in U.S. Pat. No. 5,625,735 A, or its corresponding F.R. Patent No. 2 725 796 A discribes an optical solution applied to fiber-optic leads for determining the orientation of the plane of polarization of the end of the optical fiber for the purpose of connecting it correctly. This document is therefore not aimed at locating or identifying the ends of cables or leads, making it alien to the objectives of the present invention.

BRIEF SUMMARY OF INVENTION

The present invention eliminates the drawbacks of all of the current methods or means mentioned above, by providing a device allowing the ends of leads, wires, cables, conduits or the like to be identified with certainty, whatever their number and their arrangement, without interrupting the link created by these leads, wires, cables or conduits, and therefore without stopping the operation of the connected systems, and without electromagnetic or other interference, and to do so in a particularly simple and inexpensive manner.

According to the invention, a device for visually identifying cable assemblies or conduits, comprises an optical fiber disposed on a lead, wire, cable or conduit and extending from a first end thereof to a second end of the lead, wire, cable or conduit, the optical fiber comprising a first fiber end disposed at the first end of the lead, wire, cable or conduit and a second fiber end disposed at the second other end of the lead, wire, cable or conduit. The device further comprises a menas for injecting light disposed proximate the first fiber end, wherein the first fiber end is accessible so as to be illuminated by the means for injecting light and the second fiber end is accessible so as to recover the light injected at the first fiber end.

The invention emits light at the first end of the lead, wire, cable or conduit in question and identifies the second end of the same lead, wire, cable or conduit with the appearance of an easily recognizable light signal at this other end.

Such an identification device has many advantages:

- firstly, it allows identification with certainty, with no risk of error, and which is immediately interpretable, whatever the length and the path of the lead or the like, the end of which is sought, and whatever the total number of leads or the like;
- locating the end of the lead or the like is accomplished without disconnecting the latter, and therefore without the electrical or fluid link being interrupted, and during operation (this also not being interrupted) of the system connected;
- the use of purely optical signals avoids any electromagnetic interference;
- the leads or the like, equipped with optical fibers, may be "universal", that is to say there is no longer any need to differentiate them by particular colors or by customized labels, thereby making the proposed system particularly simple and inexpensive;
- the proposed system does not require, on the leads, either additional electrical conductors or active components such as light-emitting diodes, thereby contributing to its simplicity and to its low cost;

further simplicity in terms of structure and use results from the fact that the device is completely "reversible", the two ends of the leads or the like, and of their optical fibers, being formed in the same way, and it not mattering whether the light is injected at one of these two ends or the other;

the proposed device requires no modification or adaptation of the systems to which the leads or the like can be connected. This device is thus independent of the constructors of such systems; and finally, the device forming the subject matter of the invention requires, in its principle, no complex and expensive electronic system, while being compatible with the use (if this is desired) of optoelectronic means capable of receiving and interpreting the light signal transmitted by the optical fiber or fibers.

According to a preferred embodiment of the invention, the optical fiber, incorporated into the lead, wire, cable or conduit in question, comprises bent-back ends. Both ends of each optical fiber are thus suitably oriented, on the one hand to allow the light to be suitably injected into the first end of the lead or the like, and on the other hand to transmit a light signal easily visible at the second end of the same lead or the like, while the two ends of the latter are connected.

In one embodiment of the invention, the ends, particularly the bent-back ends, of the optical fiber are embedded in connectors provided at the two ends of the lead, wire, cable or conduit in question. Thus, the first and second fiber ends of the optical fibers may, in the case of computer jumper leads, be embedded in standardized connectors, for example of the "RJ-45" type, usually placed at the ends of such leads.

Advantageously, two optical fibers are placed parallel to each other in or on the lead, wire, cable or conduit in question, the respective ends of these two optical fibers being bent back in diametrically opposed directions. This makes it possible in all cases to make the end of at least one of the optical fibers easily accessible, both for injecting light and for being able to see the transmitted light signal, whatever the orientation of the corresponding end of the lead or the like.

The means for injecting light at the end of an optical fiber comprises a moveable accessory comprising a body or casing accommodating an electrical power supply, a flexible elongate element, and a light source, such as an electric light bulb or another equivalent light source, disposed at an end of the flexible elongate element.

Advantageously, The flexible elongate element carries a hollow terminal element of a generally conical shape, which is internally reflective and is designed to cover one end of a lead, wire, cable or conduit, into which the light has to be injected. The moveable accessory may thus be fitted onto the end of the lead or the like, covering this end and focussing onto it the light rays emitted by the electric light bulb, so as to concentrate the light onto the end of the optical fiber located at this end of this lead, without illuminating the ends of the adjacent leads and of their optical fibers.

It is conceivable to use, at the same time, two or more light injection means, of identical design but emitting differently colored light, so as simultaneously to locate, and without any risk of confusion, the ends of two or more leads.

Advantageously, the moveable accessory for light injection further comprises a fastening means, such as a clamp, allowing it to be held onto a lead or onto another, stationary element, which leaves the operator's hands free during an intervention.

According to another embodiment of the invention, a device for visually identifying first and second opposite ends of an elongate member, comprises an optical fiber disposed on the elongate member, the optical fiber including first and second opposite fiber ends respectively disposed adjacent to the first and second ends of the elongate member; a means for emitting light disposed proximate the first end of the elongate member; wherein the first fiber end is accessible so as to be illuminated by the means for emitting light and the second fiber end is accessible so as to recover the light emitted at the first fiber end.

BRIEF DESCRIPTION OF DRAWINGS

The invention will be more clearly understood with the aid of the description which follows, with reference to the appended schematic drawing which shows, by way of examples, a few embodiments of this device for visual identification of cable assemblies or conduits:

FIG. 1 shows, schematically, a "jumper" cabinet for computer links, using a device for visually identifying cable assemblies according to the present invention;

FIG. 2 shows a computer jumper lead with an optical fiber, according to the invention;

DETAILED DESCRIPTION OF INVENTION

Figure 3:
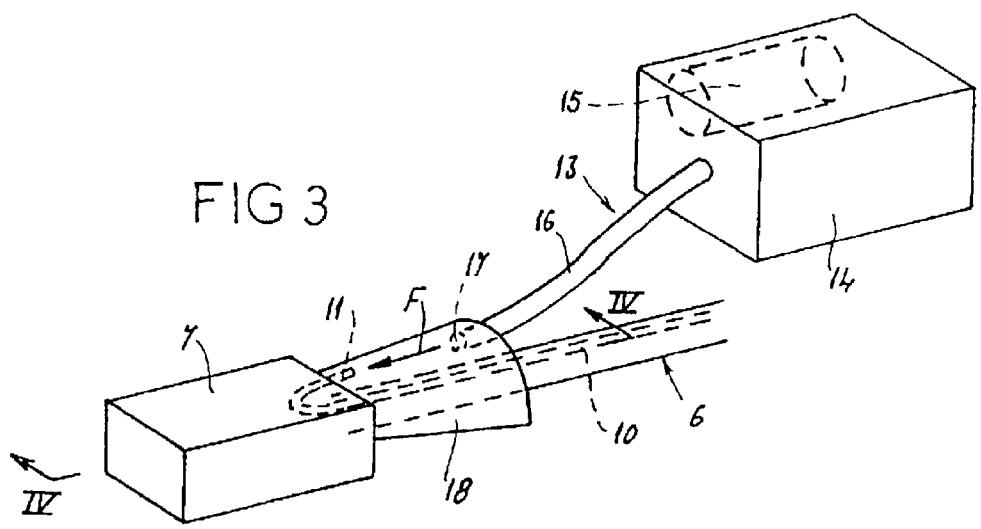
FIG. 3 is a perspective view illustrating a light injection means, according to the invention.

The invention is described below and illustrated by the drawing in the context of its particular application to locating the ends of computer jumper leads in a jumper cabinet.

FIG. 1 shows, very schematically, such a computer jumper cabinet, denoted overall by the reference 2. This jumper cabinet 2 comprises items of computer hardware 3, 4, 5, which are active or used for distribution purposes, connected together via usually a large number of jumper leads 6. As shown in FIG. 2, each jumper lead 6 possesses, at both its ends, respective connectors 7 and 8, such as standardized connectors of the "RJ-45" type, allowing the items of computer hardware 3, 4, 5 to be connected.

Figure 4:
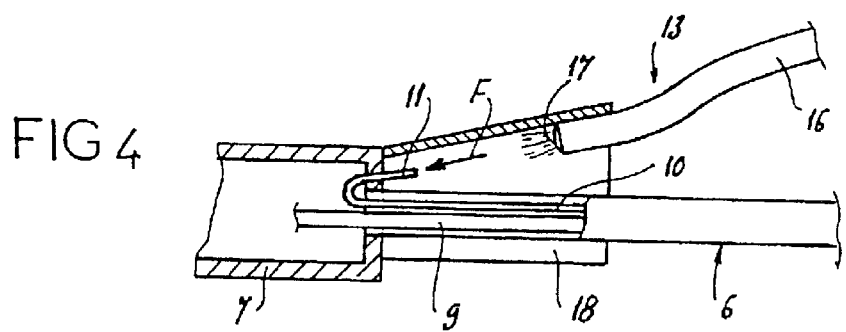
FIG. 4 is a partial longitudinal sectional view on the line IV—IV of FIG. 3.

According to the invention, and as shown in FIGS. 2 to 4, each jumper lead 6 has, apart from conductors 9 extending from one connector 7 to the other 8, at least one optical fiber 10 which, again, extends over the entire length of this lead 6, from one end of the latter to the other.

The optical fiber 10, placed in the outer sheath of the lead 6, has a first end 11 of bent-back shape, partially embedded in the first end connector 7 of the lead 6. Similarly, the optical fiber 10 has a second end 12 of bent-back shape, partially embedded in the second end connector 8 of the lead 6.

Thus, light injection as indicated by the arrow F, facing the first bent-back end 11 of the optical fiber 10, at that end of the lead 6 which is provided with the first connector 7, is accompanied by light scattering D by the second bent-back end 12 of the optical fiber 10. The second end 12 of the optical fiber 10 is thus easily located by a light signal, possibly a colored light signal, without any risk of error and without the need to disconnect the lead 6, even if the latter is surrounded by many other similar leads.

The light is injected at one end of the lead 6 by the use here of a moveable accessory, denoted overall by the reference 13. The accessory 13 for injecting light comprises a body or case 14 that accommodates a power supply, comprising for example of one or more batteries 15. The body 14 is extended by a flexible elongate element 16, at the free end of which is placed a small electric light bulb 17 supplied by the battery or batteries 15. At its free end, the flexible elongate element 16 also carries a hollow terminal element 18 of conical shape, slit longitudinally, which may be engaged around the end of the lead 6, against the connector 7 and/or on this connector 7. The conical terminal element 18 possesses a reflective internal surface.

Thus, the accessory 13 may be fitted onto the first end of the lead 6 selected, and then, the electric light bulb 17 being lighted, a light beam is emitted and concentrated onto the end 11 of the optical fiber 10, belonging to the single lead 6 selected.

The body or case 14 of the accessory 13 for light injection also carries, advantageously, a clamp 19 or other fastening means, allowing it to be temporarily held onto a lead 6 or onto part of the jumper cabinet 2.

Figure 5:
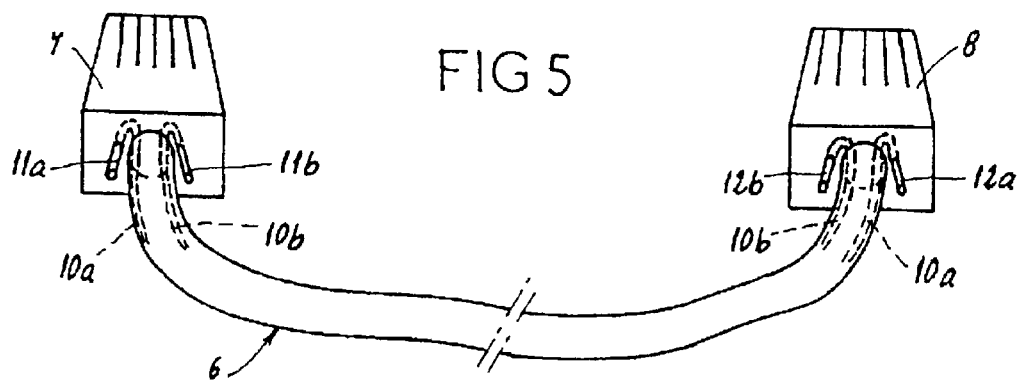
FIG. 5 shows an alternative embodiment of a lead with two optical fibers, according to the invention.

FIG. 5 illustrates an alternative embodiment of the device according to the invention, in which two optical fibers 10a and 10b are placed so as to be parallel in the same jumper lead 6. At one end of the lead 6, provided with a first connector 7, the respective ends 11a and 11b of the two optical fibers 10a and 10b are bent back in diametrically opposed directions. Likewise, at the other end of the lead 6, provided with a second connector 8, the respective ends 12a and 12b of the two optical fibers 10a and 10b are bent back in diametrically opposed directions. Thus, whatever the orientation of the connectors 7 and 8, it is easy to have, at the two ends of the lead 6 respectively, at least one optical fiber end 11a or 11b accessible for light injection and at least one optical fiber end 12a or 12b visible and able to transmit a light signal which will be correctly perceived.

It would not be outside the scope of the invention, as defined in the appended claims, to:

incorporate more or fewer optical fibers, inside the leads or around their periphery;

use other means for injecting light into the optical fibers;

apply the device to all kinds of leads, wires, cables and the like or else to fluid conduits; and produce these leads with electrical or fluid connectors of any type.

What is claimed is:

1. A device for visually identifying cable assemblies to locate first and second opposite ends of a cable, comprising:
    an optical fiber disposed on the cable and extending from the first end of the cable to the second end of the cable, the optical fiber comprising:
        a first fiber end disposed at the first end of the cable; and
        a second fiber end disposed at the second end of the cable; and
    a means for injecting light disposed proximate the first fiber end;
    wherein the first fiber end is accessible so as to be illuminated by the means for injecting light and the second fiber end is accessible so as to recover the light injected at the first fiber end; and
    wherein the first and second fiber ends each comprise a bent-back end embedded in a connector provided at each of the first and second ends of the cable.

2. The device for visually identifying cable assemblies as claimed in claim 1, wherein the optical fiber comprises two optical fibers placed parallel to each other on the cable, adjacent ends of the two optical fibers being bent back in diametrically opposed directions.

3. The device for visually identifying cable assemblies as claimed in claim 1, wherein the means for injecting light comprises a moveable accessory including a body accommodating an electrical power supply, a flexible elongate element, and a light source disposed at an end of the flexible elongate element.

4. The device for visually identifying cable assemblies as claimed in claim 3, wherein a hollow terminal element of a generally conical shape is disposed at the end of the elongate element, the hollow terminal element being internally reflective and covering the first end of the cable into which light is injected.

5. The device for visually identifying cable assemblies as claimed in claim 3, wherein the moveable accessory comprises a fastening means for allowing the moveable accessory to be held onto the cable.

6. The device for visually identifying cable assemblies as claimed in claim 5, wherein the fastening means is a clamp.

7. The device for visually identifying cable assemblies as claimed in claim 1, wherein the device is applied to locate ends of computer jumper leads in a jumper case.

8. A device for visually identifying first and second opposite ends of an elongate member, comprising:
    an optical fiber disposed on the elongate member, the optical fiber including first and second opposite fiber ends respectively disposed adjacent to the first and second ends of the elongate member; and
    a means for emitting light disposed proximate the first end of the elongate member;
    wherein the first fiber end is accessible so as to be illuminated by the means for emitting light and the second fiber end is accessible so as to recover the light emitted at the first fiber end.

9. The device according to claim 8, wherein the elongate member comprises a cable.

10. The device according to claim 8, wherein the elongate member comprises a wire.

11. The device according to claim 8, wherein the elongate member comprises a lead.

12. The device according to claim 8, wherein the elongate member comprises a conduit through which fluid flows.

* * * * *